(12) United States Patent
Tomita et al.

(10) Patent No.: US 6,196,791 B1
(45) Date of Patent: Mar. 6, 2001

(54) GAS TURBINE COOLING MOVING BLADES

(75) Inventors: Yasuoki Tomita; Hiroki Fukuno; Sunao Aoki; Kiyoshi Suenaga, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/202,951

(22) PCT Filed: Apr. 17, 1998

(86) PCT No.: PCT/JP98/01765

§ 371 Date: Dec. 23, 1998

§ 102(e) Date: Dec. 23, 1998

(87) PCT Pub. No.: WO98/48150

PCT Pub. Date: Oct. 29, 1998

(30) Foreign Application Priority Data

Apr. 23, 1997 (JP) .................................................... 9-105928

(51) Int. Cl.$^7$ ...................................................... F01D 5/18
(52) U.S. Cl. .............................. 415/115; 415/116; 416/95; 416/97 R
(58) Field of Search ..................................... 415/115, 116; 416/95, 96 R, 96 A, 97 R, 97 A; 60/39.75

(56) References Cited

U.S. PATENT DOCUMENTS

| 3,565,545 | 2/1971 | Bobo et al. . | |
| 3,791,758 | * 2/1974 | Jenkinson | 415/116 |
| 3,832,090 | * 8/1974 | Matto | 416/95 |
| 3,873,234 | * 3/1975 | Penny | 416/97 R |
| 4,178,129 | * 12/1979 | Jenkinson | 416/95 |
| 4,344,736 | * 8/1982 | Willliamson | 416/95 |
| 4,375,891 | * 3/1983 | Pask | 416/95 |
| 4,447,190 | * 5/1984 | Campbell | 416/96 |
| 4,456,427 | * 6/1984 | Evans et al. | 416/95 |
| 4,807,433 | 2/1989 | Maclin et al. . | |

FOREIGN PATENT DOCUMENTS

| 2054046 | * 2/1981 | (GB) | 416/95 |
| 49-86706 | 8/1974 | (JP) . | |
| 50-79610 | 6/1975 | (JP) . | |
| 52-34111 | 3/1977 | (JP) . | |
| 57-10704 | 1/1982 | (JP) . | |
| 3-275946 | 12/1991 | (JP) . | |
| 8-177526 | 7/1996 | (JP) . | |

* cited by examiner

Primary Examiner—Christopher Verdier
(74) Attorney, Agent, or Firm—Wenderoth, Lind & Ponack, L.L.P.

(57) ABSTRACT

In gas turbine cooled moving blade, a cooling air passage is made shortest and temperature elevation and pressure drop of the cooling air are suppressed. The cooling air passage (16) is bored in a turbine cylinder wall (15) located below a first stage stationary blade (11). The cooling air passage (16) communicates at one end (16a) with a turbine cylinder and at the other end (16b) with a space (13) between the stationary blade and the moving blade. The passage (16) is directed to an air inflow hole (6) provided in a shank portion (4) of a lower portion of a platform (2) of the moving blade (1). Cooling air is jetted from the cooling air passage (16) toward the air inflow hole (6) so as to flow into the shank portion (4) and then into the moving blade (1) for cooling thereof. An axis (17) of the cooling air passage (16) is directed so as to deviate in a rotational circumferential direction by an angle determined by the velocity of the cooling air jetted from the cooling air passage (16) and the rotational velocity of the moving blade (1) from position of the air inflow hole when the moving blade (1) stands still in row with the stationary blade (11) in rotor axial direction. Thus, the cooling air can be jetted in an optimal direction with the shortest distance, and the temperature elevation and pressure drop of the cooling air can be suppressed to minimum.

2 Claims, 3 Drawing Sheets

GAS TURBINE COOLING MOVING BLADES

This application is a national stage application, filed under 35 U.S.C. 371, of International Application No. PCT/JP98/01765, filed Apr. 17, 1998, which claims priority based on Japanese Application No. JP 9-105928, filed Apr. 23, 1997.

BACKGROUND OF THE INVENTION

1. Field of the Invention

The present invention relates to a gas turbine cooled moving blade in which a cooling air supply passage, connected to a moving blade, is improved so that temperature elevation and pressure drop of cooling air on the way to the moving blade are suppressed.

2. Description of the Prior Art

FIG. 3 is a cross sectional view showing a prior art air cooled system of a moving blade in a gas turbine inlet portion. In the figure, numeral 21 designates a first stage moving blade, numeral 22 designates a platform thereof, numeral 23 designates a blade root portion and numeral 24 designates a shank portion of a lower portion of the platform 22. Numeral 31 designates a stationary blade, which is adjacent to the moving blade 21, numeral 32 designates an inner shroud thereof, numeral 33 designates a cavity in a lower portion of the inner shroud 32 and numeral 34 designates an outer shroud. Numeral 40 designates a rotor disc, numeral 41 designates a disc cavity and numeral 42 designates a radial hole, which is bored in the rotor disc 40 for supplying cooling air therethrough.

The moving blade 21 is arranged alternately with the stationary blade 31 in a rotor axial direction and is fixed to the rotor disc 40 via plural pieces along a rotor circumferential direction, so that the rotor may be driven rotatably due to combustion gas 60 coming from a combustor.

In the gas turbine constructed as above, cooling of the moving blade is achieved by the cooling air, for which a portion of rotor cooling air is used. That is, cooling air 50 flows into the disc cavity 41 and is led into the blade root portion 23 via the radial hole 42 provided in the rotor disc 40. And then, the cooling air passes through the shank portion 24 and the platform 22, flows into an air passage (not shown) provided in a blade interior for cooling of the blade and is discharged into a combustion gas passage through a blade surface or a blade trailing edge portion.

In the prior art arrangements cooling for the gas turbine moving blade, cooling air from a rotor cooling system is led from the disc cavity 41 into the air passage for cooling the moving blade through the radial hole 42, the blade root portion 23, the shank portion 24 and the platform 22, as mentioned above. However, as the cooling air 50 is led into the moving blade 21 interior, the cooling air receives heat from the rotor disc etc. so as to become elevated in temperature, and pressure thereof is lowered, so that there occurs a loss until the cooling air is supplied into the air passage in the moving blade 21. Thus, in order to enhance cooling efficiency, it is necessary to lessen such temperature elevation and pressure loss of the cooling air to the extent possible.

SUMMARY OF THE INVENTION

In view of the problem in the prior art gas turbine cooled moving blade, it is a first object of the present invention to provide an improved gas turbine cooled moving blade in which a cooling air passage is provided for supplying cooling air into a moving blade. Thereby the cooling air is jetted into a lower portion of a moving blade platform from below a stationary blade via a short passage so that temperature elevation is reduced to the extent possible and pressure loss is also reduced resulting in enhanced cooling efficiency.

Further, it is a second object of the present invention to provide an improved gas turbine cooled moving blade, mentioned above, in which the cooling air passage is directed optimally to a rotating moving blade so that the cooling air is jetted at an appropriate velocity so as to be supplied into the moving blade efficiently.

In order to attain the above objects, the present invention provides the following means:

(1) A gas turbine cooled moving blade constructed such that cooling air is led into a moving blade for cooling thereof from a lower portion of a moving blade platform. An air inflow hole is provided in a shank portion of the lower portion of the moving blade platform and a cooling air passage is provided passing through a turbine cylinder wall located below a stationary blade which is adjacent and in front of the moving blade. The cooling air passage is connected at one end to a turbine cylinder and at the other end to a space between the stationary blade and the moving blade. The cooling air is led from the one end and is jetted from the other end toward the air inflow hole so as to flow thereinto.

(2) A gas turbine cooled moving blade as mentioned in (1) above, characterized in that the cooling air passage is formed linearly and is directed to a position which is deviated in a rotational circumferential direction of the air inflow hole by an angle determined by a jetted velocity of the cooling air jetted the said cooling air passage and a rotational velocity of the moving blade from a position of the air inflow hole when the moving blade stands still in a row with the stationary blade in an axial direction of the rotor.

In the invention of (1) above, the cooling air from the turbine cylinder flows into one end of the cooling air passage and is jetted from the other end thereof into the space between the stationary blade and the moving blade toward the air inflow hole provided in the shank portion of the moving blade. The cooling air so jetted reaches the air inflow hole so as to flow thereinto and to be further led into the moving blade for cooling thereof through the shank portion and the platform.

Thus, according to the invention of (1) above, there no need for a radial hole such as that in the prior art as provided in the rotor disc of the moving blade and the cooling air is jetted toward the air inflow hole of the moving blade with the shortest length from below the stationary blade. Thereby ,temperature elevation of the cooling air on the way to the moving blade can be suppressed to a minimum and pressure loss thereof can be also lessened and cooling performance of the moving blade is enhanced.

In the invention of (2) above, the cooling air passage of the invention of (1) above is directed to the position deviated by a predetermined angle in the rotational direction of the moving blade from the position of the air inflow hole at the time when the moving blade stands still, and when the moving blade and thus the air inflow hole rotate. The cooling air is then jetted in the jetted velocity corresponding to the moving velocity of the air inflow hole so that the cooling air reaches the air inflow hole in time, thereby the cooling air can be supplied in the optimal direction while the moving blade rotates and the effect of invention (1) can be enhanced further.

BRIEF DESCRIPTION OF THE DRAWINGS

FIGS. 2(a)-2(b) are explanatory views of jetting of cooling air in the gas turbine cooled moving blade of the embodiment shown in FIG. 1, wherein FIG. 2(a) is a perspective view thereof and FIG. 2(b) is a view showing the relation between rotational velocity of the moving blade and jetted velocity of the cooling air.

DETAILED DESCRIPTION OF THE PREFERRED EMBODIMENTS

Figure 1:
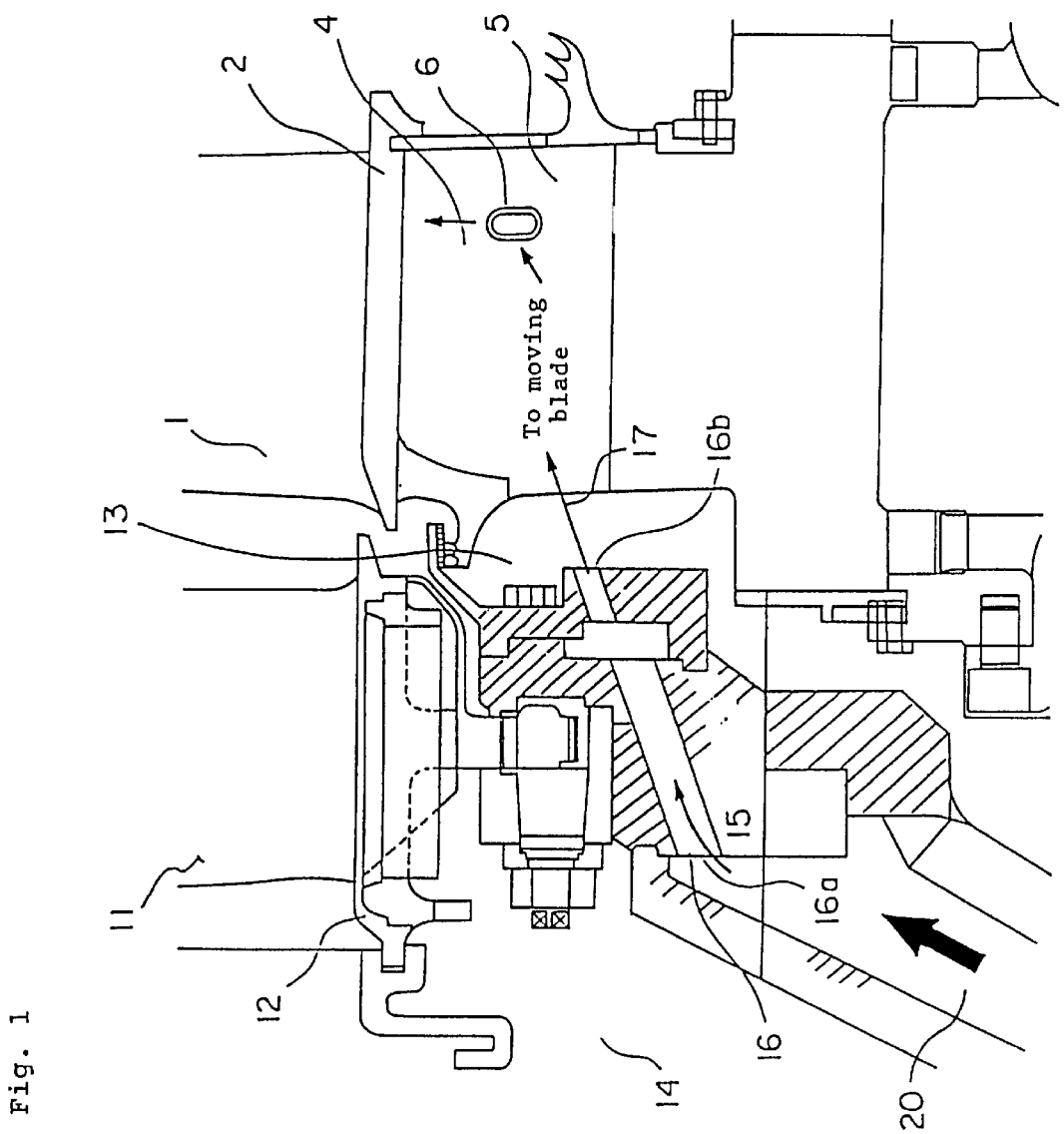
FIG. 1 is a cross sectional view of a blade root portion of a gas turbine cooled moving blade constructed in accordance with one embodiment of the present invention.

Herebelow, embodiments according to the present invention will be described in detail with reference to the drawing figures. FIG. 1 is a cross sectional view of a blade root portion of a gas turbine cooled moving blade in accordance with one embodiment of the present invention. In FIG. 1, numeral 1 designates a first stage moving blade and numeral 2 designates a platform thereof. A seal pin is provided between two platforms which are mutually adjacent along a rotor circumferential direction for sealing a space between the two platforms. Numeral 4 designates a shank portion of a lower portion of the platform 2, numeral 5 designates a blade root portion and numeral 6 designates an air inflow hole provided in a side surface of the shank portion 4.

Numeral 11 designates a first stage stationary blade which is adjacent to the moving blade 1 and numeral 12 designates an inner shroud thereof. Numeral 13 designates a space between the stationary blade 11 and the moving blade 1, numeral 14 designates a turbine cylinder and numeral 15 designates a turbine cylinder wall. Numeral 16 designates a cooling air passage, which is bored in the turbine cylinder wall so as to pass therethrough and is connected at its one end 16a to the turbine cylinder 14 and at its the other end 16b to the space 13 openingly.

The cooling air passage 16 is formed in a straight line which is inclined upwardly in the turbine cylinder wall 15 below the stationary blade 11 and its axis 17 is directed to the air inflow hole 6 of the shank portion 4 of the adjacent moving blade 1 so that cooling air jetted from the cooling air passage 16, as described later, reaches in time the air inflow hole 6 of the moving blade 1, while it is rotating, in order to flow thereinto efficiently.

Figure 2A:
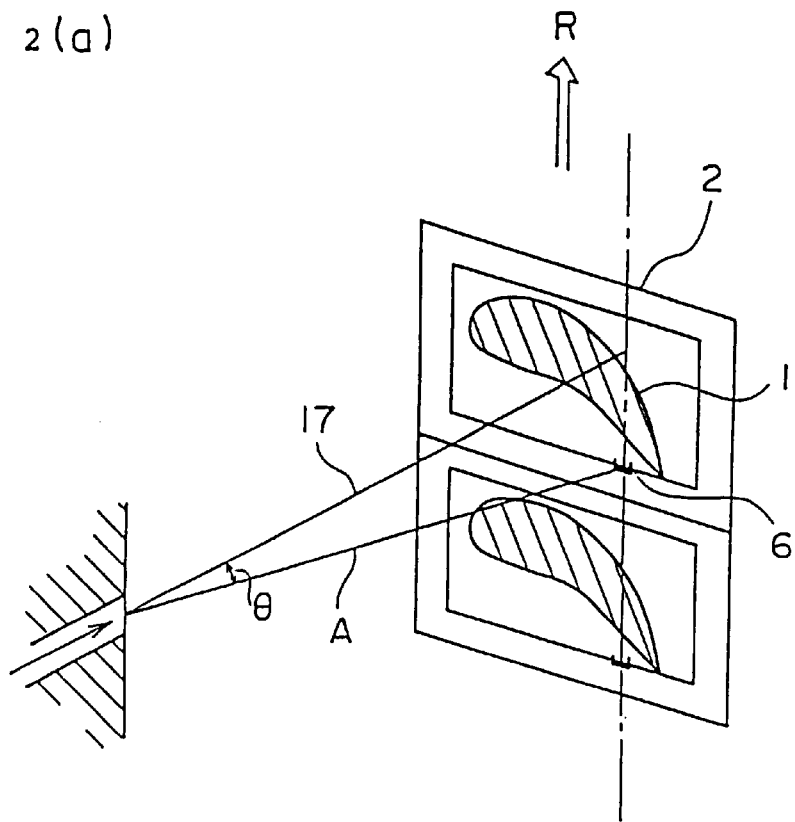
Figure 2B:
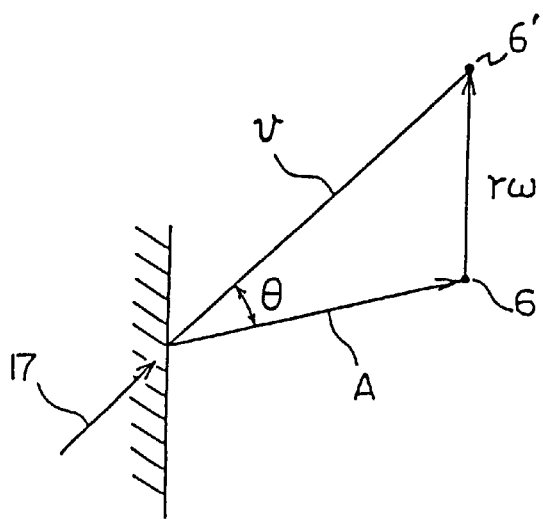
Figure 3:
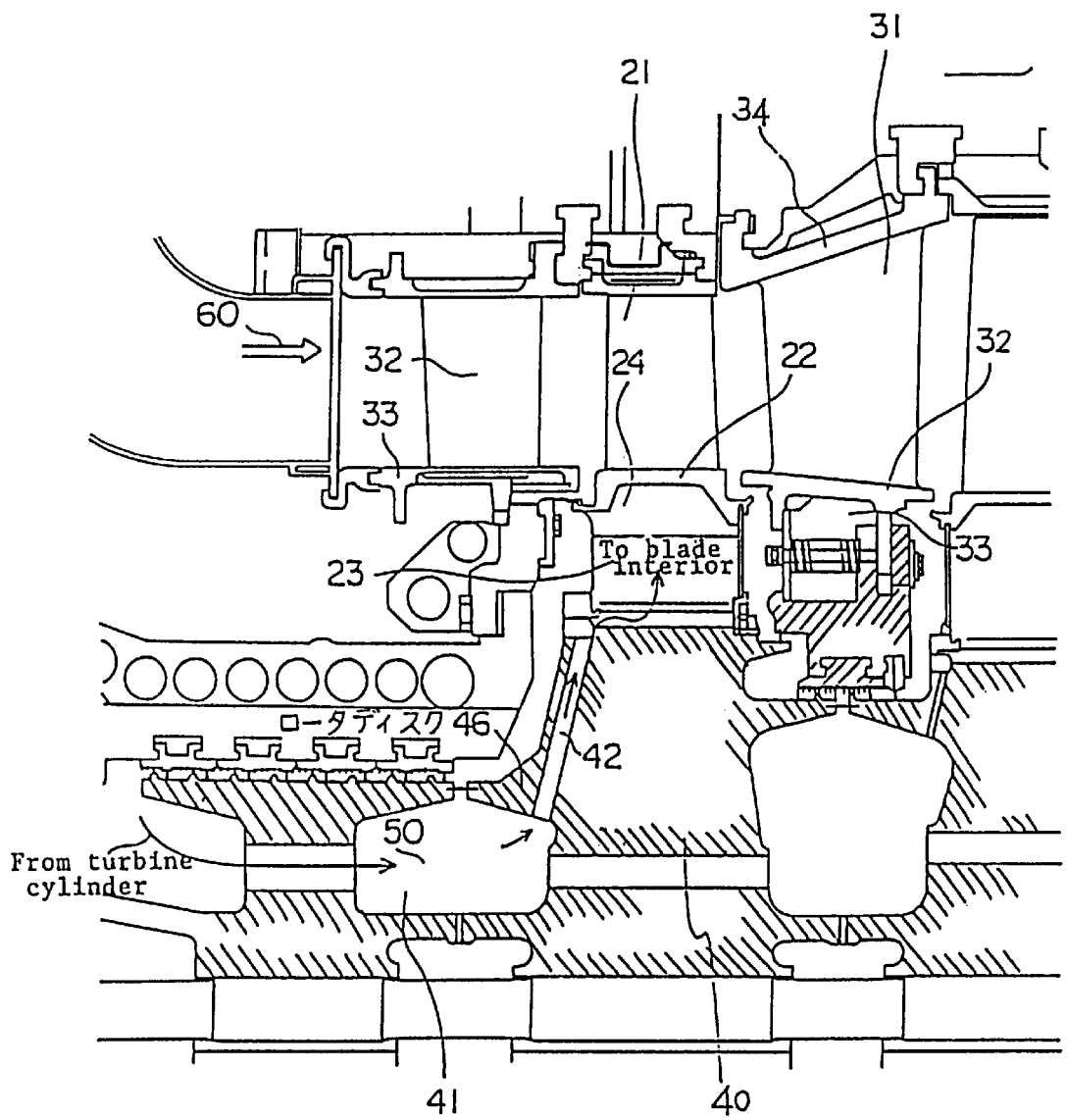
FIG. 3 is a cross sectional view showing a prior art air cooled system of a moving blade in a gas turbine inlet portion.

FIGS. 2(a)–2(b) show the relationship between a direction of the cooling air passage 16 and the air inflow hole 6 of the moving blade 1. In particular, FIG. 2(a) shows the relation between the cooling air passage 16 and the air inflow hole 6 when the moving blade 1 stands still in a row with the stationary blade along a rotor axial direction, and FIG. 2(b) shows the relation between the cooling air passage 16 and the air inflow hole 6 when the moving blade 1 rotates in a rotational direction R of the rotor with an angular velocity ω.

In the state of the moving blade 1 standing still, as shown in FIG. 2(a), the axis 17 of the cooling air passage 16 is set with a deviation of angle θ toward the rotor rotational direction R from a direction to the air inflow hole 6 (line A) along its rotational circumference, which is in consideration of a jetted velocity of the cooling air. Usually, if the cooling air is jetted toward the direction of line A, it will reach the air inflow hole 6 with a shortest length to flow into the shank portion 4 of the lower portion of the platform 2, but actually the moving blade 1 rotates and the axis 17 deviates in direction so as to meet an amount of movement in a rotational velocity of the moving blade 1.

The relation between the cooling air passage 16 and the air inflow hole 6 in the moving state is shown in FIG. 2(b). Where a correct direction in which the cooling air flows into the air inflow hole 6 when the moving blade stands still is shown by A, the air inflow hole 6, rotating in the angular velocity ω, rotates in a rotational velocity γω to come to a position 6'. On the other hand, the jetted velocity v of the cooling air which is jetted from the cooling air passage 16 along the axis 17 is set so that the cooling air reaches the position 6' coincidentally, as shown in FIG. 2(b), and an angle between two directions along the axis 17 of the cooling air passage 16 and to the air inflow hole 6 at this time is shown as θ. Thus, an optimal direction relative to the air inflow hole 16 in which the rotation of the moving blade 1 is taken into account can be determined.

In the gas turbine moving blade, constructed as mentioned above, cooling air 20 is led into the end portion 16a of the cooling air passage 16 provided in the turbine cylinder wall 15 below the stationary blade 11 and is jetted from the other end portion 16b thereof into the space 13. The jetted velocity of this cooling air is set to a predetermined velocity v corresponding to the rotational velocity of the moving blade 1, as shown in FIG. 2(b). A jetting pressure at this time is nearly the same as the pressure in the space 13, and the pressure in the shank portion 4 is lower than that in the space 13, hence the cooling air so jetted into the space 13 flows easily into the air inflow hole 6.

The axis 17 of the cooling air passage 16 deviates by an appropriate angle or distance in the rotational direction of the air inflow hole 6 as mentioned above, hence when the moving blade 1 rotates, the cooling air is jetted with a jetted velocity v corresponding to the rotational velocity γω of the air inflow hole so as to pass through the space 13 and reach the air inflow hole 6 in time while it is rotating and then flow into the shank portion 4 from the air inflow hole 6.

The cooling air which has entered the shank portion 4 is led into an air passage in the moving blade 1 for cooling thereof via an air passage (not shown) of a lower portion of the platform 2 and is discharged outside through a blade surface or a blade trailing edge portion. Thus, shower head cooling, film cooling and/or slot cooling air can be effected.

According to the gas turbine cooled moving blade of the embodiment mentioned above, the construction is arranged such that the cooling air passage 16 passes through the turbine cylinder wall 15 below the stationary blade 11 of a first stage and is directed toward the air inflow hole 6 of the moving blade 1 in the optimal direction in which the rotational velocity is taken into account and the cooling air is jetted therefrom in the jetted velocity corresponding to the rotational velocity of the moving blade 1 so as to flow into the air inflow hole 6 via the space 13. Thereby, a passing route of the cooling air reaching the moving blade 1 is made shortest and there is no need to pass through the radial hole of the moving blade 1 in the prior art, thus temperature elevation of the cooling air is suppressed to the minimum and pressure drop also can be suppressed with the result that the cooling efficiency is enhanced.

The structure of the cooled moving blade of the present invention, especially as explained in FIG. 1, relates to the moving blade 1 of the first stage and it will be more effective if the structure is applied to a case where the cooling air passage 16 can be provided linearly with a shortest length through the turbine cylinder wall 15 of the first stage stationary blade 11 and the cooling is applied to a moving blade which needs an enhanced cooling effect.

The present invention relates to a gas turbine cooled moving blade constructed such that cooling air is led into a moving blade for cooling thereof from a lower portion of a moving blade platform. An air inflow hole is provided in a shank portion of the lower portion of the moving blade platform and a cooling air passage passes through a turbine cylinder wall below a stationary blade which is adjacent and in front of the moving blade. The cooling air passage communicates at its one end to a turbine cylinder and at its other end to a space between the stationary blade and the moving blade. Also, the cooling air is led from the one end and is jetted from the other end toward the air inflow hole so as to flow thereinto. Thereby the cooling air passage is made shortest and there is no need to provide a radial hole such as that provided below the moving blade in the prior art. Thus, temperature elevation of the cooling air on the way to the moving blade can be suppressed to the minimum and pressure loss can be also lessened.

The present invention also relates to a gas turbine cooled moving blade in which the cooling air passage is formed linearly and is directed to a position which deviates in a rotational circumferential direction of the air inflow hole by an angle determined by a jetted velocity of the cooling air jetted from the cooling air passage and a rotational velocity of the moving blade from a position of the air inflow hole when the moving blade stands still in a row with the stationary blade in a rotor axial direction. Thereby the cooling air from the cooling air passage can be supplied in time into the air inflow hole of the moving blade while it is rotating and the effects of the present invention, as described above, can be further enhanced.

What is claimed is:

1. A gas turbine moving blade cooling assembly comprising:

a moving blade including a platform, and a shank portion connected to a lower portion of said platform, wherein a sidewall of said shank portion has only a single air inflow hole communicating with an interior of said moving blade;

a stationary blade disposed adjacent to and upstream of said moving blade; and a turbine cylinder disposed below said stationary blade;

a linear cooling air passage passing through a wall of said turbine cylinder, said linear cooling air passage extending radially outwardly in a direction toward said air inflow hole and away from an axis of rotation of said moving blade such that said linear cooling air passage extends through the wall of said turbine cylinder along a straight line and is inclined by an inclination angle relative to the axis of rotation of said moving blade, wherein said linear cooling air passage establishes fluid communication between an interior of said turbine cylinder and a space defined between said stationary blade and said moving blade so that cooling air from the interior of said turbine cylinder passes through said linear cooling air passage and is jetted into the space between said stationary blade and said moving blade in a direction toward said air inflow hole so as to flow into said air inflow hole.

2. The gas turbine moving blade cooling assembly as claimed in claim 1, wherein said cooling air passage has a longitudinal axis which is aligned with a position that is deviated in a rotational circumferential direction from said air inflow hole by an angle determined by a jetted velocity of cooling air jetted from said cooling air passage and a rotational velocity of said moving blade.

\* \* \* \* \*